(12) United States Patent
Frey

(10) Patent No.: US 9,206,824 B2
(45) Date of Patent: Dec. 8, 2015

(54) FRAME CONNECTOR ASSEMBLY FOR LARGE PORTABLE FRAMEWORKS

(71) Applicant: MOSS HOLDING COMPANY, Elk Grove Village, IL (US)

(72) Inventor: Robert Frey, Salt Lake City, UT (US)

(73) Assignee: Moss Holding Company, Elk Grove Village, IL (US)

( * ) Notice: Subject to any disclaimer, the term of this patent is extended or adjusted under 35 U.S.C. 154(b) by 111 days.

(21) Appl. No.: 13/851,757

(22) Filed: Mar. 27, 2013

(65) Prior Publication Data
US 2014/0294492 A1  Oct. 2, 2014

(51) Int. Cl.
F16B 7/04 (2006.01)
F16B 9/02 (2006.01)

(52) U.S. Cl.
CPC ......... *F16B 7/0473* (2013.01); *Y10T 403/4602* (2015.01); *Y10T 403/4697* (2015.01); *Y10T 403/591* (2015.01); *Y10T 403/60* (2015.01); *Y10T 403/602* (2015.01); *Y10T 403/68* (2015.01); *Y10T 403/7067* (2015.01)

(58) Field of Classification Search
USPC .............. 403/231, 245, 246, 254, 264, 322.1, 403/327, 343, 374.1, 374.2, 374.3, 380, 403/382, 398, 403, DIG. 12, DIG. 13, 326; 52/285.4, 584.1, 655.1
See application file for complete search history.

(56) References Cited

U.S. PATENT DOCUMENTS

| | | | |
|---|---|---|---|
| 3,574,367 A | 4/1971 | Jankowski | |
| 3,966,342 A | 6/1976 | Moriya | |
| 4,015,638 A * | 4/1977 | Graf | 139/91 |
| 4,101,226 A * | 7/1978 | Parisien | 403/4 |
| 4,348,130 A * | 9/1982 | Lautenschlager | 403/231 |
| 4,556,337 A * | 12/1985 | Marshall | 403/255 |
| 4,974,987 A | 12/1990 | Smock | |
| 5,005,607 A * | 4/1991 | Shimizu | 403/53 |
| 5,464,299 A * | 11/1995 | Scharer et al. | 403/264 |
| 5,673,531 A | 10/1997 | Carcedo et al. | |
| 6,119,427 A | 9/2000 | Wyman et al. | |
| 6,148,569 A | 11/2000 | Giovannetti | |
| 7,578,110 B2 | 8/2009 | Jenkins | |
| 8,057,120 B2 * | 11/2011 | Wernlund et al. | 403/264 |

FOREIGN PATENT DOCUMENTS

DE  3602686  * 8/1987 ............. F16B 12/32

* cited by examiner

*Primary Examiner* — Josh Skroupa
(74) *Attorney, Agent, or Firm* — Lance M. Pritikin

(57) ABSTRACT

A frame connector assembly is configured to releasably, rigidly, and safely join large frame members to one another to form temporary structures. A connector assembly typically comprises a housing, a hoop element, a first cam block, a second cam clock and a rotatable actuator adapted to be engaged by a torquing tool. The housing is secured within the first frame member. Rotation of the actuator causes the threadedly-engaged second cam element to force movement of the first cam element in a direction opposing a spring bias. The hoop element is resultingly pulled toward the housing, along with a cleat or other detent element which is affixed to the second frame member. The housing can be manufactured inexpensively by way of extrusion. The frame connector assembly is adaptable to facilitate rapid construction and disassembly of various frame joint configurations, including end-to-face joints, and mitered 90-degree joints.

25 Claims, 5 Drawing Sheets

FRAME CONNECTOR ASSEMBLY FOR LARGE PORTABLE FRAMEWORKS

TECHNICAL FIELD

The present invention relates generally to portable display framing systems designed to form large temporary structures, particularly where such framing systems are substantially comprised of extruded metal frame members which are reversibly interconnected.

BACKGROUND

The current art of fabricating large, portable display system frames typically involves two methods: nut-and-bolt assembly, and portable fabricating systems. Nut-and-bolt systems can be labor-intensive and inconvenient for use in constructing temporary, portable displays, as there are many separate parts which must be assembled and disassembled, and which may be easily lost. Portable fabricating systems on the other hand were developed specifically to construct portable and temporary frameworks. They commonly employ quick connection mechanisms that are quicker and easier to use and involve fewer parts than nut-and-bolt systems. However, conventional quick-connection mechanisms are typically designed to engage frame members having a channel, commonly called a "system groove," that runs the length of one or more of its exterior faces. This system groove allows a "lock" connector located in the end of a perpendicular opposing member to grab the inside edge of the system groove with small hardened steel flanges.

As the popularity of portable display structures has increased, so has the use of such products in larger framing applications. Applications requiring structure sizes from 20 feet wide by 20 feet long by 10 feet high to up to 100 feet in length and 30 feet in height are now more common. Snap frame systems typically have an inherent "looseness" at every joint, and are therefore not appropriate for use in applications requiring high strength.

With conventional lock connector systems, the user typically inserts small flanges into small grooves and blindly engages the flanges. Because the user generally does not see the flanges of the lock connector engaging the respective groove, they cannot visually ensure that the flanges are seated properly. This is exacerbated when assembling large frames, as the girth, weight, and length of the members being attached to one another are so large that the user is even more likely to have difficulty aligning the small connector flanges into small grooves in the adjacent frame member. Such system groove products were designed to construct relatively small temporary frameworks, such as those used at indoor tradeshows and the like.

Further, conventional system groove-engaging connection systems frequently place gravitational loads onto the lock flanges in a direction parallel to the system groove. Thus, any failure of the lock/groove interface, due to user error in engaging the lock or due to improper alignment, may result in the lock flanges (and the respective frame member) sliding down the associated groove or falling out of the groove entirely.

What is needed is a quick-release frame connection system which is suited for the rapid assembly and disassembly of large, heavy display and event frameworks, is simpler to use than conventional quick connector systems, is more cost effective, and achieves these benefits while increasing overall safety.

SUMMARY

Certain deficiencies of the prior art may be overcome by the provision of one or more embodiments of a frame connector assembly and related frame kits as discussed herein.

A frame connector assembly may be received by a first frame member which is generally hollow and elongated along a first longitudinal axis. The frame connector assembly releasably secures the first frame member to a second frame member having, for example, a cleat element featuring a tongue portion. Embodiments of a frame connector assembly may comprise a connector housing, a hoop element, a first cam block, a second cam block and an actuator.

The connector housing may have a connector axis and be adapted to be rigidly received substantially within the first frame member such that the connector axis is generally parallel with the first longitudinal axis. The hoop element may include a pair of legs and a cross member therebetween. The legs may extend through the connector housing for guided movement of the hoop element along the connector axis between a release position and a retention position. The connector housing, legs and cross member may collectively define a hoop eyelet adapted to receive the tongue portion therethrough. The hoop eyelet may be configured to generally loosely receive the tongue portion therethrough when the hoop element is in its release position. The hoop eyelet may be configured to loopingly draw the tongue portion toward the connector housing when the hoop element is moved toward its retention position.

The first cam block may be affixed to the legs for axial movement therewith. The actuator may have an actuator axis and a threaded section along its shaft. The actuator may be at least partially received within the connector housing for rotation about the actuator axis. The second cam block is in threaded association with the actuator element for transport of the second cam block along the actuator axis between a first position and a second position upon rotation of the actuator element. A second camming face of the second cam block slidably engages a first camming face of the first cam block for forcing the first cam block toward its retention position upon transport of the second cam block toward its second position.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
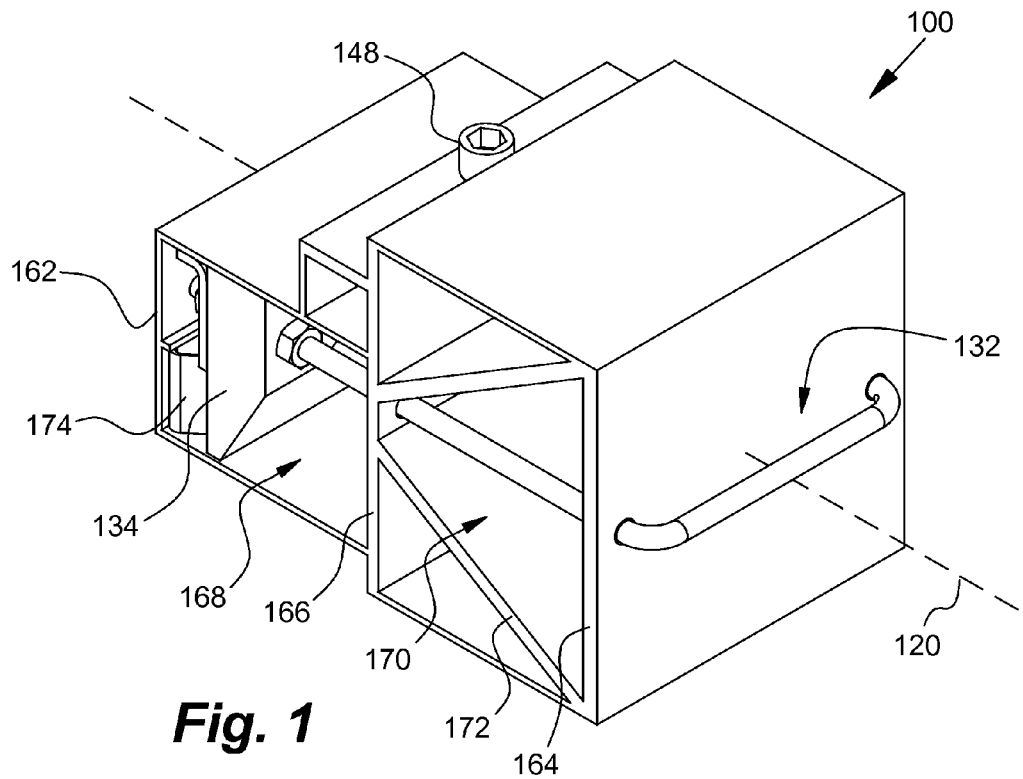
FIG. 1 is a diagrammatic perspective view of one example embodiment of a frame connector assembly in accordance with the present invention.

Referring now to the drawings, like reference numerals designate identical or corresponding features throughout the several views.

Figure 3:
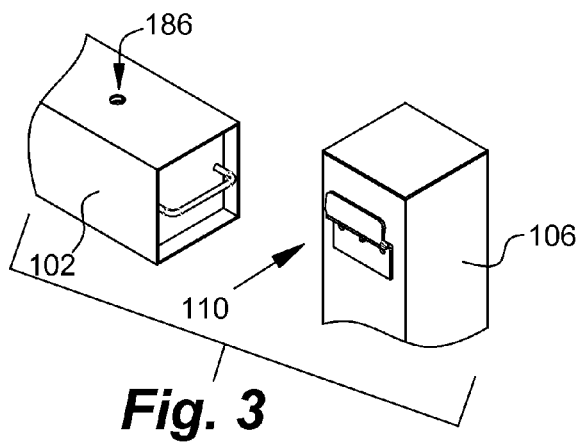
FIG. 3 is a diagrammatic partial perspective view of one embodiment of a frame kit in accordance with the present invention, wherein a first frame member and a second frame member are about to be rigidly releasably secured to one another by way of the connector assembly of FIG. 1.
Figure 4:
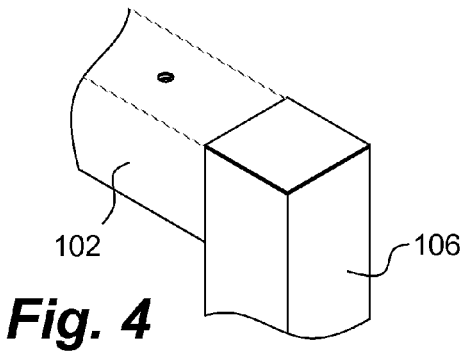
FIG. 4 is a diagrammatic partial perspective view of the embodiment similar to that of FIG. 3, but wherein the first and second frame members are rigidly releasably secured to one another by way of securing engagement between the connector assembly and a cleat element.
Figure 6:
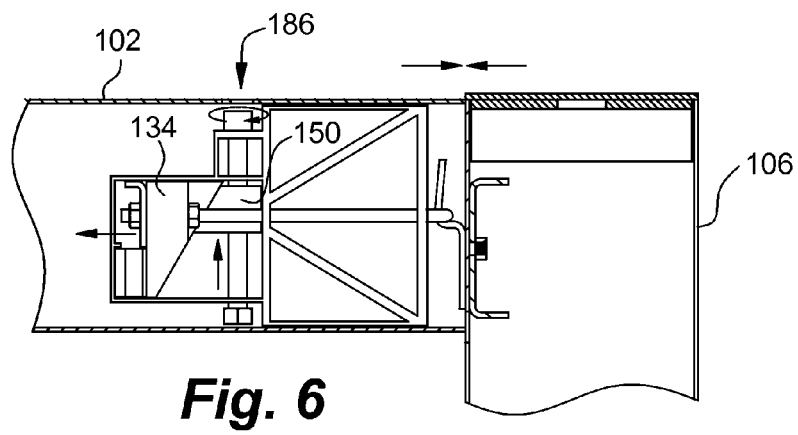
FIG. 6 is a diagrammatic view of the frame kit shown in FIG. 4, wherein the frame members are shown in cross-section, the hoop element and first cam block are in their retention position, and the second cam block is shown in its second position.

Referring to FIGS. 1, 3 and 6, for example, embodiments of a frame connector assembly 100 may be configured to be received by a first frame member 102, which may be generally hollow and elongated along a first longitudinal axis 104, for releasably securing the first frame member 102 to a second frame member 106 having a cleat element 110 with a tongue portion 114. Typical preferred embodiments are designed to connect large frame members, each such frame member having an extruded cross section of approximately, for example, 120 mm by 120 mm.

Figure 2:
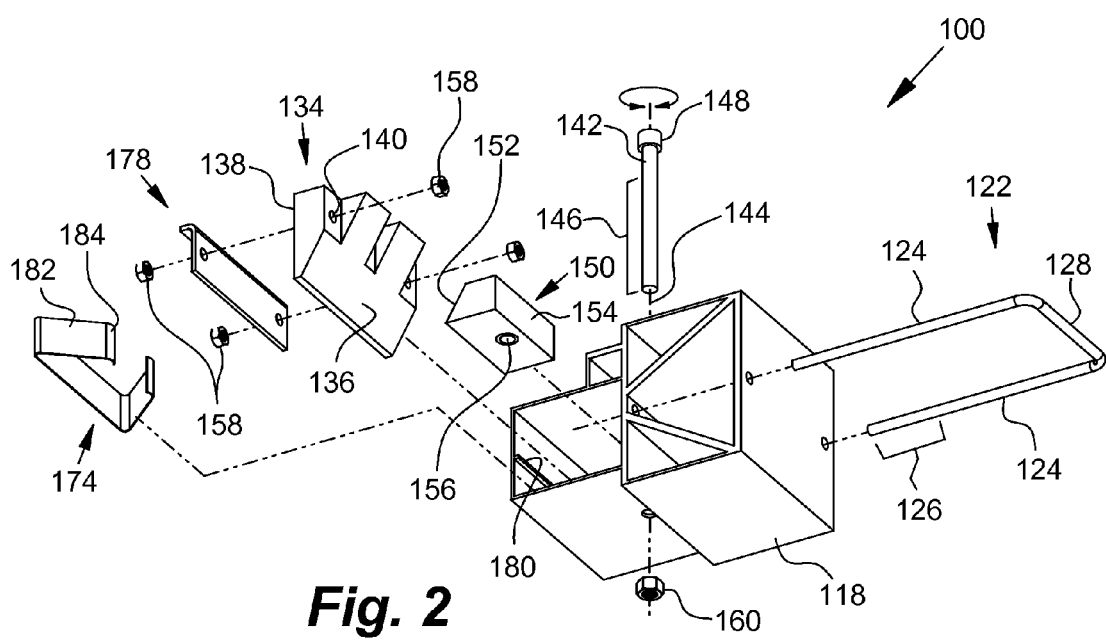
FIG. 2 is a diagrammatic exploded view of the embodiment shown in FIG. 1.

Referring to FIGS. 1 and 2 for illustration, embodiments of a frame connector assembly 100 may typically comprise a connector housing 118, a hoop element 122, a first cam block 134, an actuator element 142 and a second cam block 150. The connector housing may have a connector axis 120 and be adapted to be rigidly received substantially within the first frame member 102 such that the connector axis 120 is generally parallel with the first longitudinal axis 104. In embodiments, the connector housing 118 may preferably be a unitary metal component formed by extrusion in a direction substantially perpendicular to the connector axis 120. The connector housing 118 of certain embodiments may be formed, for example, substantially of 6063 T5 Aluminum extrusion or the equivalent.

Figure 5:
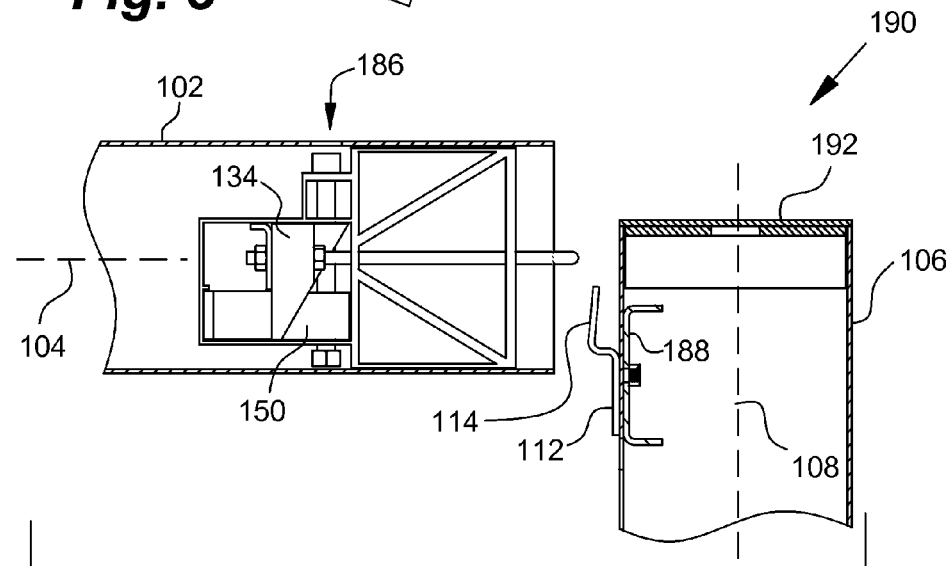
FIG. 5 is a diagrammatic view of the frame kit shown in FIG. 3, wherein the frame members are shown in cross-section, the hoop element and first cam block are shown in their release position, and the second cam block is shown in its first position.
Figure 7:
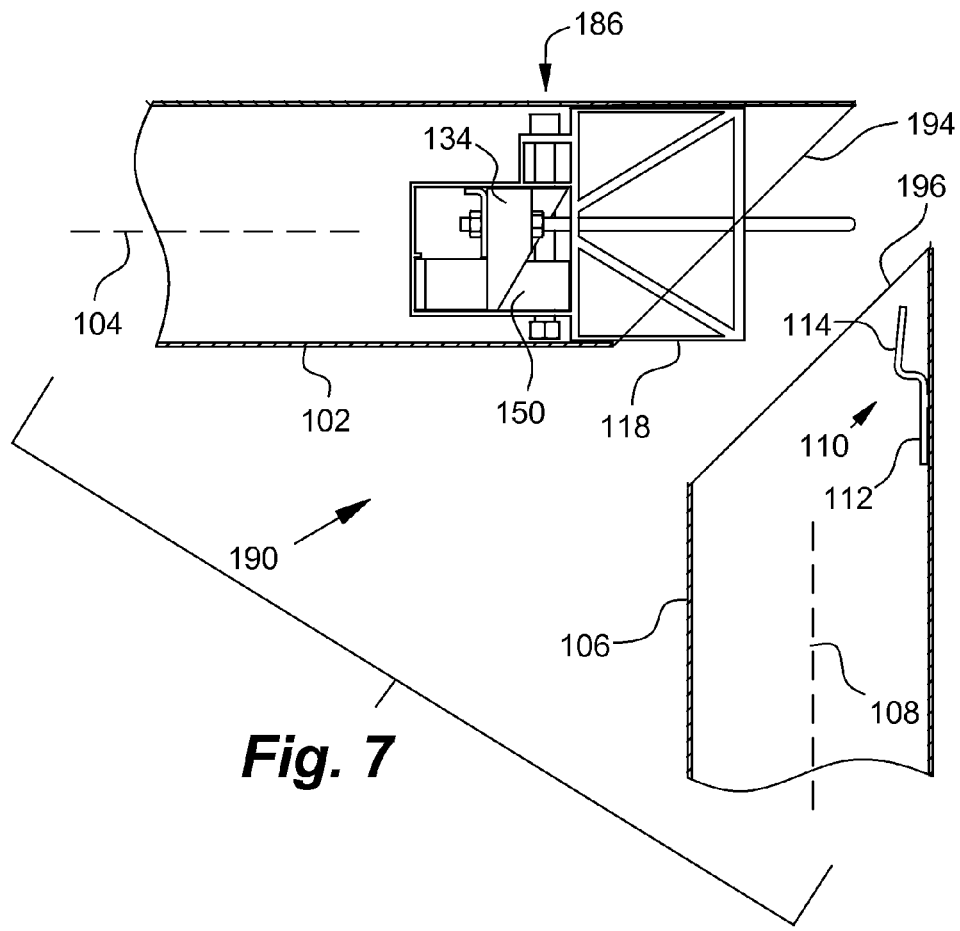
FIG. 7 is a diagrammatic partial cross-sectional view of a further embodiment of a frame kit in accordance with the present invention, wherein the first and second frame members have respective frame ends which are beveled and a portion of the connector housing extends outward of the first frame end for receipt by the second frame member by way of the second frame end.
Figure 10:
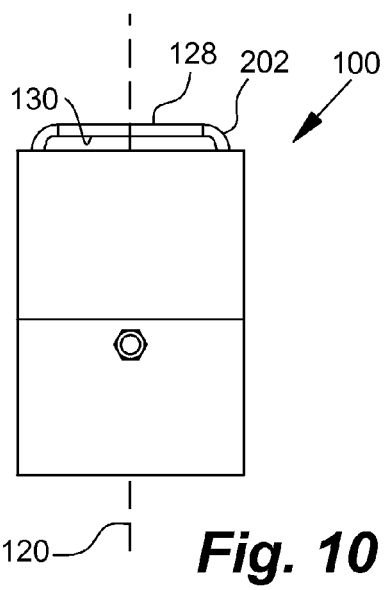
FIG. 10 is a diagrammatic bottom view of the frame connector assembly of FIG. 1.

A hoop element 122 may include, for example, a pair of legs 124 and a cross member 128 therebetween. As illustrated for example in FIGS. 1 and 10, the cross member 128 may be disposed outwardly of the connector housing 118. The legs 124 may be at least partially received by the connector housing 118 for movement of the hoop element 122 generally along the connector axis 120 between a release position (as shown, for example, in FIG. 5) and a retention position (as shown, for example, in FIG. 6). In embodiments, the connector housing 118, legs 124 and cross member 128 may collectively define a hoop eyelet 132 adapted for receipt of the tongue portion 114 of a cleat element 110 therethrough. Referring to FIGS. 5 and 7, for example, the hoop eyelet 132 may be configured to generally loosely receive the tongue portion 114 therethrough when the hoop element 122 is in its release position. Referring to FIG. 6 for illustration, in particular preferred embodiments, the hoop eyelet 132 may be configured, for example, to loopingly draw the tongue portion 132 toward the connector housing 118 when the hoop element 122 is moved toward its retention position. The hoop element 122 of certain embodiments may be formed of ¼-inch steel rod, for example.

In embodiments, a first cam block 134 may be affixed to the legs 124 for axial movement with the legs 124 generally along the connector axis 120.

Referring to FIG. 1 for illustration, an actuator element 142 may have an actuator axis 144 and a threaded section 146 along a shaft. As shown in FIGS. 5-9, for example, the actuator element 142 may be at least partially received within the connector housing 118 for rotation of the actuator element 142 about the actuator axis 144. The actuator element 142 may include a head portion 148 adapted to be torqueingly engaged by a hand-operated torqueing tool, by way of, for example, an access aperture 186 in the first frame member 102. Such hand-operated torquing tool may preferably be a powered hand tool in order to expedite assembly and disassembly of the respective frame kit. As shown in FIG. 1, the actuator axis 144 may be substantially perpendicular to said connector axis. The actuator element 142 of certain embodiments may be, for example, a steel socket-head cap screw.

In embodiments, a second cam block 150 may be, for example, in threaded association with the actuator element 142 for transport of the second cam block 150 along the actuator axis 144 between a first position (shown, for example, in FIG. 5) and a second position (as shown, for example, in FIG. 6) upon rotation of the actuator element 142. A second camming face 152 of the second cam block 150 may be adapted to slidably engage a first camming face 136 of the first cam block 134 for forcing the first cam block 134 toward its retention position upon transport of the second cam block 150 toward its second position (see, for example, FIG. 6). The second cam block 150 of certain embodiments may include a threaded brass insert which provides the means for direct threaded association with the actuator element 142.

Figure 8:
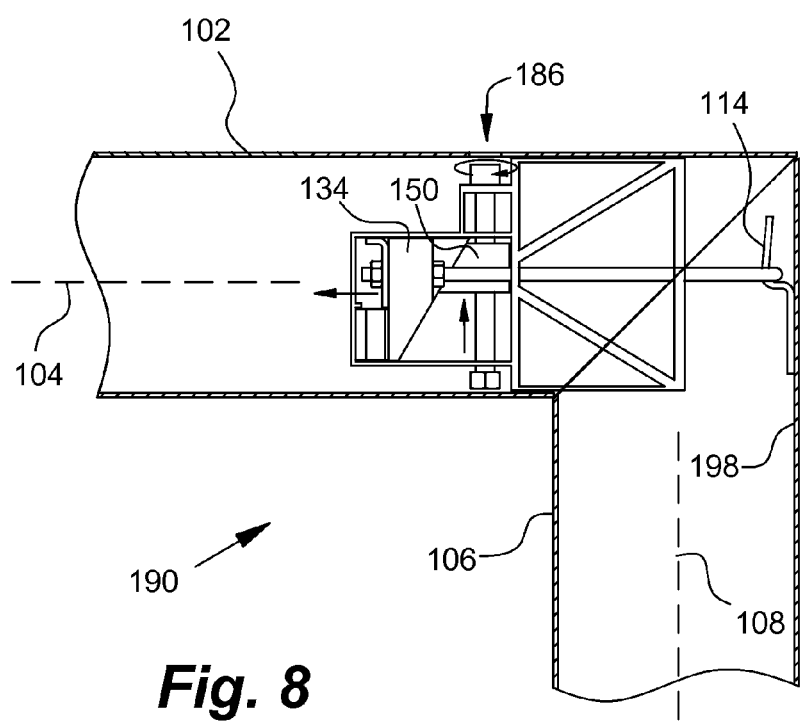
FIG. 8 is a diagrammatic partial cross-sectional view of the embodiment of FIG. 7, but wherein the frame members are rigidly connected to one another to form a frame joint at their respective beveled ends with a portion of the connector housing extending outward of the first frame end and received by the second frame member, thereby providing further torsional rigidity at the joint.
Figure 15:
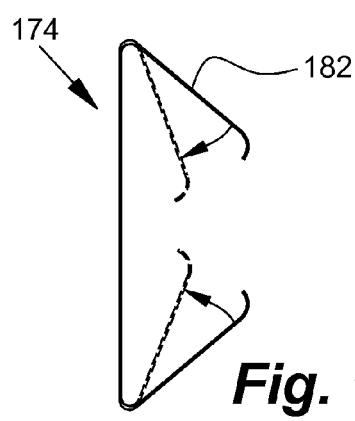
FIG. 15 is a diagrammatic top front view of one possible embodiment of a spring element in accordance with the present invention.

Referring to FIGS. 5 and 7 for example, in certain preferred embodiments of a frame connector assembly 100, the first cam block 134 may be resiliently biased toward its release position. Referring to FIGS. 6 and 8, such resilient bias may be configured to be overcome by transport of the second cam block 150 from its first position toward its second position. In particular embodiments, the resilient bias may be provided by, for example, a spring element 174. Referring to FIGS. 2 and 15 for example, a flat spring 174 may have two laterally opposed cantilever spring arms 182, and each arm may include a generally rounded end 184. In embodiments, a flat spring 174 may be made substantially of formed spring steel.

Referring to FIGS. 1 and 2 for illustration, in particular embodiments, each leg 124 may have a threaded portion 126 at least partially received by the first cam block 134 and affixed thereto by way of a respective pair of threaded retainers 158 threadedly disposed on the threaded portion 126 on opposing sides of the first cam block 134. Equivalent alternative means for affixing the hoop element 122 to the first cam block would be understood by persons skilled in the art, with the benefit of the teachings herein.

Referring once again to FIG. 1 for illustration, in certain preferred embodiments the connector housing 118 may include a first wall 162, a second wall 164, and an intermediate wall 166 therebetween. A cam compartment 168 may be generally defined between the first wall 162 and the intermediate wall 166. A hoop alignment compartment 170 may be defined between the second wall 164 and the intermediate wall 166. The first and second cam blocks may be housed substantially within the cam compartment 168. The legs 124 may extend through the second wall 164 and intermediate wall 166. The hoop eyelet 132 may extend generally outwardly of the second wall 164. Embodiments of the connector housing 118 may further include one or more oblique walls 172 extending diagonally between the intermediate wall 166 and the second wall 164 to provide added strength to the assembly.

In particular embodiments, the first cam block 134 may include a bias face 138 generally opposed to the first camming face 136. In such embodiments, the resilient bias may be provided by a spring element 174 disposed between the first wall 162 and the bias face 138. A spring lip 180 may be provided to prevent undesirable travel of the spring element 174 in a direction perpendicular to the connector axis.

In certain embodiments, the second cam block 150 may include a second support face 154 generally opposed to the second camming face 152. In such embodiments, the intermediate wall 166 may be configured to be supportingly associated with the second support face 154 for substantially preventing travel of the second cam block 150 toward the second wall 164 throughout transport of the second cam block 150 toward its second position.

Figure 11:
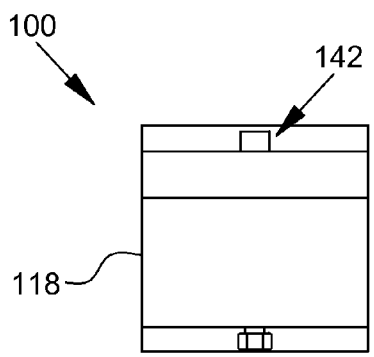
FIG. 11 is a diagrammatic rear view of the frame connector assembly of FIG. 1, showing the actuator element being confined within the outermost cross-sectional profile of the connector assembly as viewed along the connector axis.

Referring to FIG. 11 for illustration, in particular preferred embodiments, the connector housing 118 may have an outermost cross-sectional profile when viewed along the connector axis. Further, the actuator element 142 may preferably be substantially confined within the outermost cross-sectional profile. Such a configuration may make it more convenient for the fully-assembled connector assembly 100 to be axially inserted into the first frame member 102. The connector assembly 100 may be rigidly received and retained within a first frame member by way of, for example, rivets, screws, bolts, high-strength glues, a combination thereof or the like.

Given the operational loads and interactive movement applied between the first and second cam blocks, in preferred embodiments the first cam block and second cam block may be comprised substantially of a high-strength, low-friction polymer, such as, for example, a thermoplastic polyethylene. In particular preferred embodiments, the thermoplastic polyethylene may be ultra-high-density polyethylene.

Referring now to FIGS. 3-9 for illustration, embodiments of a frame kit 190 may comprise a first frame member 102, a second frame member 106, and a frame connector assembly 100. The first frame member 102 may be generally hollow and elongated along a first longitudinal axis 104. Similarly, a second frame member 106 may be elongated along a second longitudinal axis 108. The second frame member 106 may have a cleat element 110 rigidly affixed thereto, by way of, for example, a set of bolts extending through the wall of the second frame member 106 and threadedly engaging a cleat backer plate 188. A cleat element 110 of certain embodiments may be made substantially of ⅛-inch steel plate. The connector housing 118 may have a connector axis 120 and be adapted to being rigidly received substantially within the first frame member 102 such that the connector axis 120 is generally parallel with the first longitudinal axis 104

Figure 9:
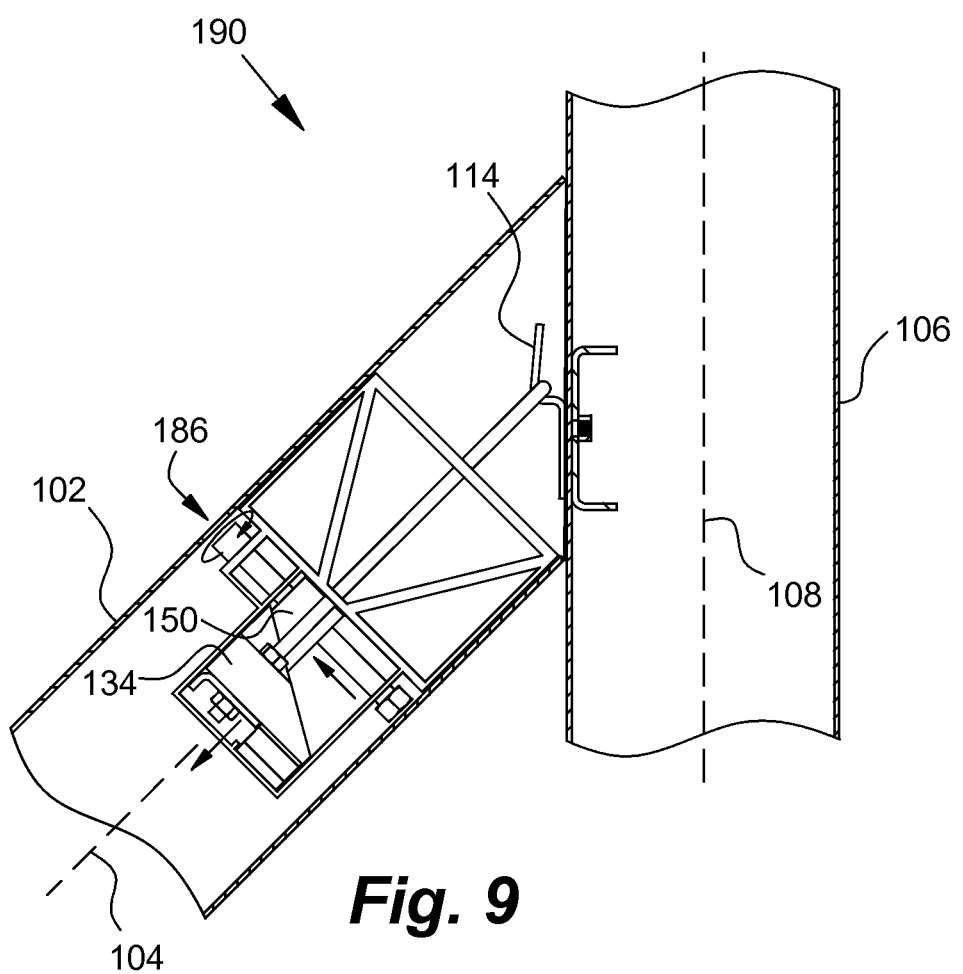
FIG. 9 is a diagrammatic partial cross-sectional view of an embodiment similar to those of FIGS. 6 and 8, but wherein the frame joint is formed between a beveled first end of the first frame member and a lateral wall of the second frame member.

Referring to FIGS. 6, 8 and 9, in certain embodiments of a frame kit 190, the first frame member 102 and the second frame member 106 may be rigidly connected to one another to form a frame joint therebetween. The rigid and secure frame joint is typically formed by way of the frame connector assembly 100 being rigidly received substantially within the first frame member 102 such that the connector axis 120 is generally parallel with the first longitudinal axis 104 and the cross member 128 is proximate a first end 194 of the first frame member 102. Further, the tongue portion 114 is received through the hoop eyelet 132 with the hoop element 122 being in its retention position. With reference to FIGS. 2 and 3, and as illustrated for example in FIGS. 6, 8 and 9, the cross member 128 may engage the cleat element 110 when the hoop eyelet 132 is in receipt of the tongue portion 114 therethrough.

Figure 12:
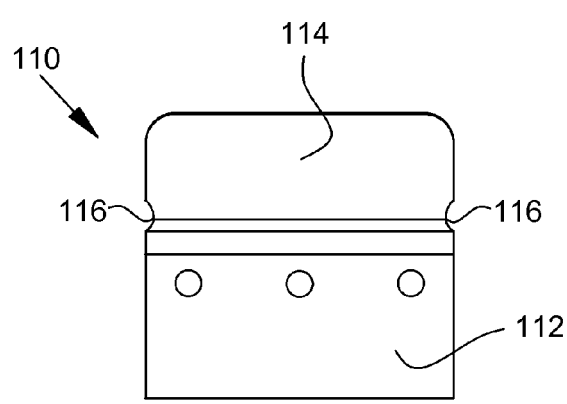
FIG. 12 is a diagrammatic front view of one embodiment of a cleat element in accordance with the present invention.
Figure 13:
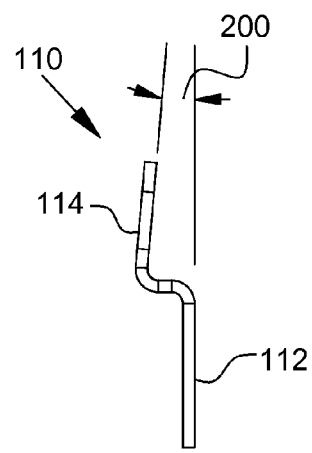
FIG. 13 is a diagrammatic side view of the cleat element of FIG. 12.
Figure 14:
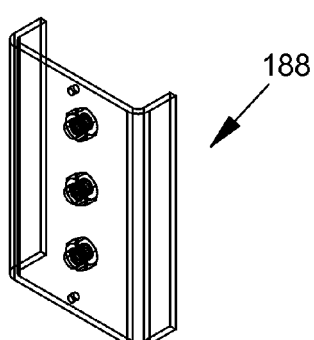
FIG. 14 is a diagrammatic perspective front view of one embodiment of a cleat backer plate, which may preferably be configured to threadedly and reinforcingly receive bolts by which the cleat element is attached to the second frame member.

Referring to FIGS. 5, 12 and 13 for illustration, in embodiments of a frame kit 190, the cleat element 110 may include a base portion 112 and may be rigidly affixed to the second frame member by way of the base portion 112. Moreover, in preferred embodiments the tongue portion 114 may extend from the base portion 112 in a direction generally parallel with the second longitudinal axis 108. Notably, when the second frame member is used as a vertical component of a larger framework, such a configuration allows the first frame member 102 to remain vertically supported by the cleat element 110 (and second frame member) in a stable configuration even when the connector assembly 100 is in its open, unsecured configuration (i.e., the hoop element 122 being in its release position). This provides an important safety feature which is particularly invaluable for protecting personnel during hurried assembly and disassembly of relatively, large, heavy, metal frameworks.

Referring to FIG. 12 for illustration, in certain embodiments, the cleat element 110 may include lateral notches 116, which may be adapted to receive rounded corners between the legs 124 and the cross member 128 of the hoop element 122 once the connector assembly is actuated to move the hoop element to its secure position. Further, referring to FIG. 13, the tongue portion 114 may extend at a slight inward angle 200 with respect to the base portion 112 (or to second frame axis 108). Such inward angle 200 may preferably be between 5-15 degrees. In certain embodiments, the inward angle 200 may be 5 degrees. These optional cleat features improve both the usability and securement of the connector system. Additionally, referring to FIG. 10, the inside face 130 of the cross member 128 may be slightly flattened in order to, for example, increase the contact area between the cross member 128 and the inside face of the tongue portion 114.

Referring to FIGS. 7-9 for illustration, in particular embodiments of a frame kit 190 the first frame end 194 may be beveled at an angle of, for example, approximately 45 degrees with respect to the first frame axis 104. In other similar embodiments, this angle may preferably be, for example, anywhere between 30 and 60 degrees. Referring to FIG. 9 for example, in such embodiments, the frame joint may be formed between the first frame end 194 and a lateral wall of the second frame member 106.

Referring in particular to FIGS. 7 and 8, in certain embodiments of a frame kit 190 the first frame end 194 may beveled at an angle of approximately 45 degrees with respect to the first frame axis 104, and the second frame end 196 may also be beveled at an angle of approximately 45 degrees with respect to the second frame axis 108. In such embodiments, a mitered frame joint may be formed between the first and second frame ends. Notably and as illustrated, in such configuration a portion of the connector housing 118 may extend outward of the first frame end 194 and be received by the second frame member 106, thereby providing further torsional rigidity at the joint. Moreover, in such frame kit configurations, the base portion 112 of the cleat element 110 may be rigidly affixed to an inner surface 198 of the second frame member 106. A second frame member 106 may include an end cover 192.

In particular embodiments of a frame connector assembly, the second frame member may include a detent element 110. The detent element may take the form of a cleat element 110, or, for example, it may take the form of a tongue-receiving loop element (not shown) affixed to the second frame member in place of a cleat element. In embodiments, the hoop element 122 may be adapted to be placed in penetrative relationship with the detent element (as shown, for example, in FIG. 6). The penetrative relationship is unsecured when the hoop element 122 is in its release position. The hoop element may be configured to draw the detent element (e.g., tongue portion 114 or a loop element) toward the connector housing 118 and secure the penetrative relationship when the hoop element 122 is moved toward its retention position. In certain such embodiments, such as the ones shown in FIGS. 1-9, the connector housing 118, legs 124 and cross member 128 may collectively define a hoop eyelet 132, and the penetrative relationship would be defined by receipt of at least a portion of the detent element 110 through the eyelet 132. In particular alternative embodiments, the cross member 128 may itself include a tongue portion (downwardly facing, for example), the detent element may include a loop portion, and the penetrative relationship would therefore be defined by receipt of the tongue portion through the loop portion.

Embodiments may be adapted to allow a user to add fabric graphics to the smooth framework by cladding the frame members with an additional small extrusion that accepts a gasket edged fabric graphic panel. By cladding the smooth frame, users can have a bare frame with no graphic that is smooth and clean, or may put graphics on the frame. More importantly, cladded embodiments allow the user to design unique display solutions, including locating a fabric graphic panel on any face of the frame extrusion. This allows the frame to be a design feature if desired. Certain embodiments allow options ranging from showing the entire frame with a graphic, showing part of the frame with graphic, or hiding the frame completely by covering it with graphics.

Providing cladding for attaching gasket edged fabric graphics to frameworks is typically conventionally done on custom metal and/or wood structures and not on a portable framing systems. Contrastingly, embodiments of the present invention combine the attributes of a portable, smooth frame system with the flexibility of attaching graphics via cladding in any configuration possible. A seller of embodiments herein may clad the frame members, and ship them to the purchaser with the cladding permanently attached.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A frame connector assembly configured to be received by a first frame member which is generally hollow and elongated along a first longitudinal axis, for releasably securing said first frame member to a second frame member having a cleat element with a tongue portion, said frame connector assembly comprising:
a connector housing having a connector axis and adapted to be rigidly received substantially within said first frame member such that said connector axis is generally parallel with said first longitudinal axis;
a hoop element including a pair of legs and a cross member therebetween, said legs being at least partially received by said connector housing for movement of said hoop element along said connector axis between a release position and a retention position, said connector housing, legs and cross member collectively defining a hoop eyelet adapted for receipt of said tongue portion therethrough with said cross member engaging said cleat element, said hoop eyelet being configured to generally loosely receive said tongue portion therethrough when said hoop element is in its release position, said hoop eyelet being configured to loopingly draw said tongue portion toward said connector housing when said hoop element is moved toward its retention position;
a first cam block affixed to said legs for said axial movement therewith;
an actuator element having an actuator axis and a threaded section, said actuator element being at least partially received within said connector housing for rotation of said actuator element about said actuator axis; and
a second cam block being in threaded association with said actuator element for transport of said second cam block along said actuator axis between a first position and a second position upon rotation of said actuator element, a second camming face of said second cam block being adapted to slidably engage a first camming face of said first cam block for forcing said first cam block toward said retention position upon transport of said second cam block toward said second position.

2. A frame connector assembly as defined in claim 1 wherein said first cam block is resiliently biased toward said release position, said resilient bias being overcome by transport of said second cam block from its first position toward its second position.

3. A frame connector assembly as defined in claim 2 wherein said resilient bias is provided by a flat spring having two laterally opposed cantilever spring arms, each said spring arm including generally rounded ends.

4. A frame connector assembly as defined in claim 1 wherein each said leg has a threaded portion at least partially received by said first cam block and affixed thereto by way of a respective pair of threaded retainers threadedly disposed on said threaded portion on opposing sides of said first cam block.

5. A frame connector assembly as defined in claim 1 wherein said actuator element includes a head portion adapted to be torqueingly engaged by a hand-operated torqueing tool.

6. A frame connector assembly as defined in claim 1 wherein said actuator axis is substantially perpendicular to said connector axis.

7. A frame connector assembly as defined in claim 1 wherein said connector housing is a unitary metal component formed by extrusion substantially perpendicularly to said connector axis.

8. A frame connector assembly as defined in claim 1 wherein said connector housing includes a first wall, a second wall, and an intermediate wall therebetween, a cam compartment being generally defined between said first wall and said intermediate wall, a hoop alignment compartment being defined between said second wall and said intermediate wall, said first and second cam blocks being housed substantially within said cam compartment, said legs extending through said second wall and said intermediate wall, said hoop eyelet extending generally outwardly of said second wall.

9. A frame connector assembly as defined in claim 8 wherein
(a) said first cam block is resiliently biased toward said release position, said resilient bias being overcome by transport of said second cam block from its first position toward its second position; and
(b) said first cam block includes a bias face generally opposed to said first camming face, said resilient bias being provided by a spring element disposed between said first wall and said bias face.

10. A frame connector assembly as defined in claim 1 wherein said first and second cam blocks are comprised substantially of thermoplastic polyethylene.

11. A frame connector assembly as defined in claim 10 wherein said thermoplastic polyethylene is ultra-high-density polyethylene.

12. A frame kit comprising:
a first frame member which is generally hollow and elongated along a first longitudinal axis;
a second frame member elongated along a second longitudinal axis, said second frame member having a cleat element rigidly affixed thereto, said cleat element having a tongue portion; and
a frame connector assembly including a connector housing, a hoop element, a first cam block, a second cam clock, and an actuator element, said connector housing having a connector axis and adapted to being rigidly received substantially within said first frame member such that said connector axis is generally parallel with said first longitudinal axis, said hoop element including a pair of legs and a cross member therebetween, said legs being at least partially received by said connector housing for movement of said hoop element along said connector axis between a release position and a retention position, said connector housing, legs and cross member collectively defining a hoop eyelet adapted for receipt of said tongue portion therethrough with said cross member engaging said cleat element, said hoop eyelet being configured to generally loosely receive said tongue portion therethrough when said hoop element is in its release position, said hoop eyelet being configured to loopingly draw said tongue portion toward said connector housing when said hoop element is moved toward its retention position, said first cam block being affixed to said legs for said axial movement therewith, said actuator element having an actuator axis and a threaded section, said actuator element being at least partially received within said connector housing for rotation of said actuator element about said actuator axis, said second cam block being in threaded association with said actuator element for transport of said second cam block along said actuator axis between a first position and a second position upon rotation of said actuator element, a second camming face of said second cam block being adapted to slidably engage a first camming face of said first cam block for forcing said first cam block toward said retention position upon transport of said second cam block toward said second position.

13. A frame kit as defined in claim 12, wherein said first frame member and said second frame member are rigidly connected to one another to form a frame joint by way of:
said frame connector assembly being rigidly received substantially within said first frame member such that said connector axis is generally parallel with said first longitudinal axis and said cross member is proximate a first end of said first frame member; and
said tongue portion being received through said hoop eyelet, and said hoop element being in its retention position.

14. A frame kit as defined in claim 13, wherein
said cleat element includes a base portion and is rigidly affixed to said second frame member by way of said base portion; and
said tongue portion extends from said base portion in a direction generally parallel with said second longitudinal axis.

15. A frame kit as defined in claim 14, wherein said first end is beveled at an angle of approximately 45 degrees with respect to said first longitudinal axis, and said frame joint is formed between said first frame end and a lateral wall of said second frame member.

16. A frame kit as defined in claim 14, wherein said first frame end is beveled at an angle of approximately 45 degrees with respect to said first longitudinal axis, said second frame member having a second frame end beveled at an angle of approximately 45 degrees with respect to said second longitudinal axis, and said frame joint is formed between said first frame end and said second frame end.

17. A frame kit as defined in claim 16, wherein said base portion is rigidly affixed to an inner surface of said second frame member.

18. A frame connector assembly configured to being received by a first frame member which is generally hollow and elongated along a first longitudinal axis, for releasably securing said first frame member to a second frame member having a detent element, said frame connector assembly comprising:
a connector housing having a connector axis and adapted to being rigidly received substantially within said first frame member such that said connector axis is generally parallel with said first longitudinal axis;
a hoop element including a pair of legs and a cross member therebetween, said cross member being disposed outwardly of said connector housing, said legs being at least partially received by said connector housing for movement of said hoop element along said connector axis between a release position and a retention position, said hoop element adapted to be placed in penetrative relationship with said detent element, said penetrative relationship being unsecured when said hoop element is in its release position, said hoop element being configured to draw said detent element toward said connector housing and secure said penetrative relationship when said hoop element is moved toward its retention position;
a first cam block affixed to said legs for said axial movement therewith;
an actuator element having an actuator axis and a threaded section, said actuator element being at least partially received within said connector housing for rotation of said actuator element about said actuator axis; and a second cam block being in threaded association with said actuator element for transport of said second cam block along said actuator axis between a first position and a second position upon rotation of said actuator element, a second camming face of said second cam block being adapted to slidably engage a first camming face of said first cam block for forcing said first cam block toward said retention position upon transport of said second cam block toward said second position;

wherein said first cam block is resiliently biased toward said release position, said resilient bias being overcome by transport of said second cam block from its first position toward its second position.

19. A frame connector assembly as defined in claim 18, wherein said connector housing, legs and cross member collectively define a hoop eyelet for receiving at least a portion of said detent element.

20. A frame connector assembly configured to be received by a first frame member which is generally hollow and elongated along a first longitudinal axis, for releasably securing said first frame member to a second frame member having a cleat element with a tongue portion, said frame connector assembly comprising:

a connector housing having a connector axis and adapted to be rigidly received substantially within said first frame member such that said connector axis is generally parallel with said first longitudinal axis;

a hoop element including a pair of legs and a cross member therebetween, said legs being at least partially received by said connector housing for movement of said hoop element along said connector axis between a release position and a retention position, said connector housing, legs and cross member collectively defining a hoop eyelet adapted for receipt of said tongue portion therethrough, said hoop eyelet being configured to generally loosely receive said tongue portion therethrough when said hoop element is in its release position, said hoop eyelet being configured to loopingly draw said tongue portion toward said connector housing when said hoop element is moved toward its retention position;

a first cam block affixed to said legs for said axial movement therewith;

an actuator element having an actuator axis and a threaded section, said actuator element being at least partially received within said connector housing for rotation of said actuator element about said actuator axis; and a second cam block being in threaded association with said actuator element for transport of said second cam block along said actuator axis between a first position and a second position upon rotation of said actuator element, a second camming face of said second cam block being adapted to slidably engage a first camming face of said first cam block for forcing said first cam block toward said retention position upon transport of said second cam block toward said second position;

wherein said first cam block is resiliently biased toward said release position, said resilient bias being overcome by transport of said second cam block from its first position toward its second position, said resilient bias being provided by a flat spring having two laterally opposed cantilever spring arms, each said spring arm including generally rounded ends.

21. A frame connector assembly configured to be received by a first frame member which is generally hollow and elongated along a first longitudinal axis, for releasably securing said first frame member to a second frame member having a cleat element with a tongue portion, said frame connector assembly comprising:

a connector housing having a connector axis and adapted to be rigidly received substantially within said first frame member such that said connector axis is generally parallel with said first longitudinal axis;

a hoop element including a pair of legs and a cross member therebetween, said legs being at least partially received by said connector housing for movement of said hoop element along said connector axis between a release position and a retention position, said connector housing, legs and cross member collectively defining a hoop eyelet adapted for receipt of said tongue portion therethrough, said hoop eyelet being configured to generally loosely receive said tongue portion therethrough when said hoop element is in its release position, said hoop eyelet being configured to loopingly draw said tongue portion toward said connector housing when said hoop element is moved toward its retention position;

a first cam block affixed to said legs for said axial movement therewith;

an actuator element having an actuator axis and a threaded section, said actuator element being at least partially received within said connector housing for rotation of said actuator element about said actuator axis; and a second cam block being in threaded association with said actuator element for transport of said second cam block along said actuator axis between a first position and a second position upon rotation of said actuator element, a second camming face of said second cam block being adapted to slidably engage a first camming face of said first cam block for forcing said first cam block toward said retention position upon transport of said second cam block toward said second position;

wherein each said leg has a threaded portion at least partially received by said first cam block and affixed thereto by way of a respective pair of threaded retainers threadedly disposed on said threaded portion on opposing sides of said first cam block.

22. A frame connector assembly configured to be received by a first frame member which is generally hollow and elongated along a first longitudinal axis, for releasably securing said first frame member to a second frame member having a cleat element with a tongue portion, said frame connector assembly comprising:

a connector housing having a connector axis and adapted to be rigidly received substantially within said first frame member such that said connector axis is generally parallel with said first longitudinal axis;

a hoop element including a pair of legs and a cross member therebetween, said legs being at least partially received by said connector housing for movement of said hoop element along said connector axis between a release position and a retention position, said connector housing, legs and cross member collectively defining a hoop eyelet adapted for receipt of said tongue portion therethrough, said hoop eyelet being configured to generally loosely receive said tongue portion therethrough when said hoop element is in its release position, said hoop eyelet being configured to loopingly draw said tongue portion toward said connector housing when said hoop element is moved toward its retention position;

a first cam block affixed to said legs for said axial movement therewith;

an actuator element having an actuator axis and a threaded section, said actuator element being at least partially received within said connector housing for rotation of said actuator element about said actuator axis; and a second cam block being in threaded association with said actuator element for transport of said second cam block along said actuator axis between a first position and a second position upon rotation of said actuator element, a second camming face of said second cam block being adapted to slidably engage a first camming face of said first cam block for forcing said first cam block toward said retention position upon transport of said second cam block toward said second position;

wherein said connector housing includes a first wall, a second wall, and an intermediate wall therebetween, a cam compartment being generally defined between said first wall and said intermediate wall, a hoop alignment compartment being defined between said second wall and said intermediate wall, said first and second cam blocks being housed substantially within said cam compartment, said legs extending through said second wall and said intermediate wall, said hoop eyelet extending generally outwardly of said second wall.

23. A frame connector assembly as defined in claim 22 wherein said second cam block includes a second support face generally opposed to said second camming face, said intermediate wall configured to be supportingly associated with said second support face for substantially preventing travel of said second cam block toward said second wall throughout said transport of said second cam block toward said second position.

24. A frame connector assembly as defined in claim 22 wherein said connector housing includes one or more oblique walls extending diagonally between said intermediate wall and said second wall.

25. A frame connector assembly as defined in claim 22 wherein said connector housing has an outermost cross-sectional profile when viewed along said connector axis, said actuator element being substantially confined within said outermost cross-sectional profile.

\* \* \* \* \*